(12) United States Patent
Lin

(10) Patent No.: US 6,817,742 B2
(45) Date of Patent: Nov. 16, 2004

(54) VEHICLE REARVIEW MIRROR ASSEMBLY WITH COLOR CHANGING LEGS

(76) Inventor: Rocky Lin, P.O. Box 26-757, Taipei (TW), 106

( * ) Notice: Subject to any disclaimer, the term of this patent is extended or adjusted under 35 U.S.C. 154(b) by 1 day.

(21) Appl. No.: 10/349,690

(22) Filed: Jan. 24, 2003

(65) Prior Publication Data

US 2004/0145901 A1 Jul. 29, 2004

(51) Int. Cl.[7] .................................................. B60R 1/12
(52) U.S. Cl. .................... 362/494; 362/545; 362/492
(58) Field of Search .............................. 362/494, 545, 362/544, 543, 135, 492, 140, 540, 95, 800, 370; 359/606; 340/468, 475

(56) References Cited

U.S. PATENT DOCUMENTS 5,017,903 A * 5/1991 Krippelz, Sr. ............... 340/472
6,152,587 A * 11/2000 Berg .......................... 362/494
6,264,353 B1 * 7/2001 Caraher et al. ............. 362/494
6,572,250 B1 * 6/2003 Assinder et al. ............ 362/494

* cited by examiner

Primary Examiner—Thomas M. Sember
Assistant Examiner—Bao Q. Truong

(57) ABSTRACT

A vehicle rear assembly with color-changing arms includes a rearview mirror, a plurality of transparent arms and a plurality of arm light sources. A first end of each arm is assembled with a casing of the rearview mirror, and a second end is mounted on a body of the vehicle. The arm light sources are respectively mounted inside the transparent arms and electrically connected to a switch. The color change of the light emitted from the arm light sources through the transparent arms can notably outline the width of the car body, especially in dark conditions, to help keep a proper safety distance between running cars and avoid traffic accidents.

9 Claims, 3 Drawing Sheets

VEHICLE REARVIEW MIRROR ASSEMBLY WITH COLOR CHANGING LEGS

BACKGROUND OF THE INVENTION

1. Field of the Invention

The invention relates to a vehicle rearview mirror assembly and, more particularly, to a rearview mirror assembly with color-changing arms.

2. Description of the Related Art

To safely drive a motorized vehicle such as a car, the vehicle is usually provided with a headlight, a direction light and a taillight. In a crowded traffic, the distance between running vehicles is usually shortened, which increases the probability of traffic accidents. On the highway, the vehicles running at a high speed must keep a safety distance from one another.

In order to alert other running vehicles and pedestrians on the road, a small light or reflective plate is further mounted on the vehicle to outline the vehicle width.

The small light or reflective plate is usually mounted at a specific location on both sides of the vehicle. The location of the small light or reflective plate rarely increases the warning effect. A reflective strip further may be attached on the body of the car. However, the reflective strip, which restrictedly reflects the surrounding light, may peel off from the vehicle body and impair the aesthetic aspect of the vehicle.

Therefore, there is a need for a rearview mirror structure that can solve the above problems of the prior art.

SUMMARY OF INVENTION

It is therefore one object of the invention to provide a vehicle rearview mirror assembly with color-changing arms that can increase the warning effect and therefore allows safer driving of the vehicle.

It is another object of the invention to provide a rearview mirror assembly with color-changing arms that can increase the aesthetic aspect of the vehicle.

In order to achieve the above and other objectives, the invention provides a rear assembly with color-changing arms that includes a rearview mirror, a plurality of transparent arms and a plurality of arm light sources. A first end of each arm is mounted on the casing of the rearview mirror, and a second end is mounted on a body of the vehicle. The arm light sources are respectively mounted inside the transparent arms and electrically connected to a switch.

The color change of the light emitted from the arm light sources through the transparent arms notably outlines the width of the vehicle body, such a car body, especially in dark conditions, to help keep a proper safety distance between running vehicles and reduce the possibility of traffic accidents.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
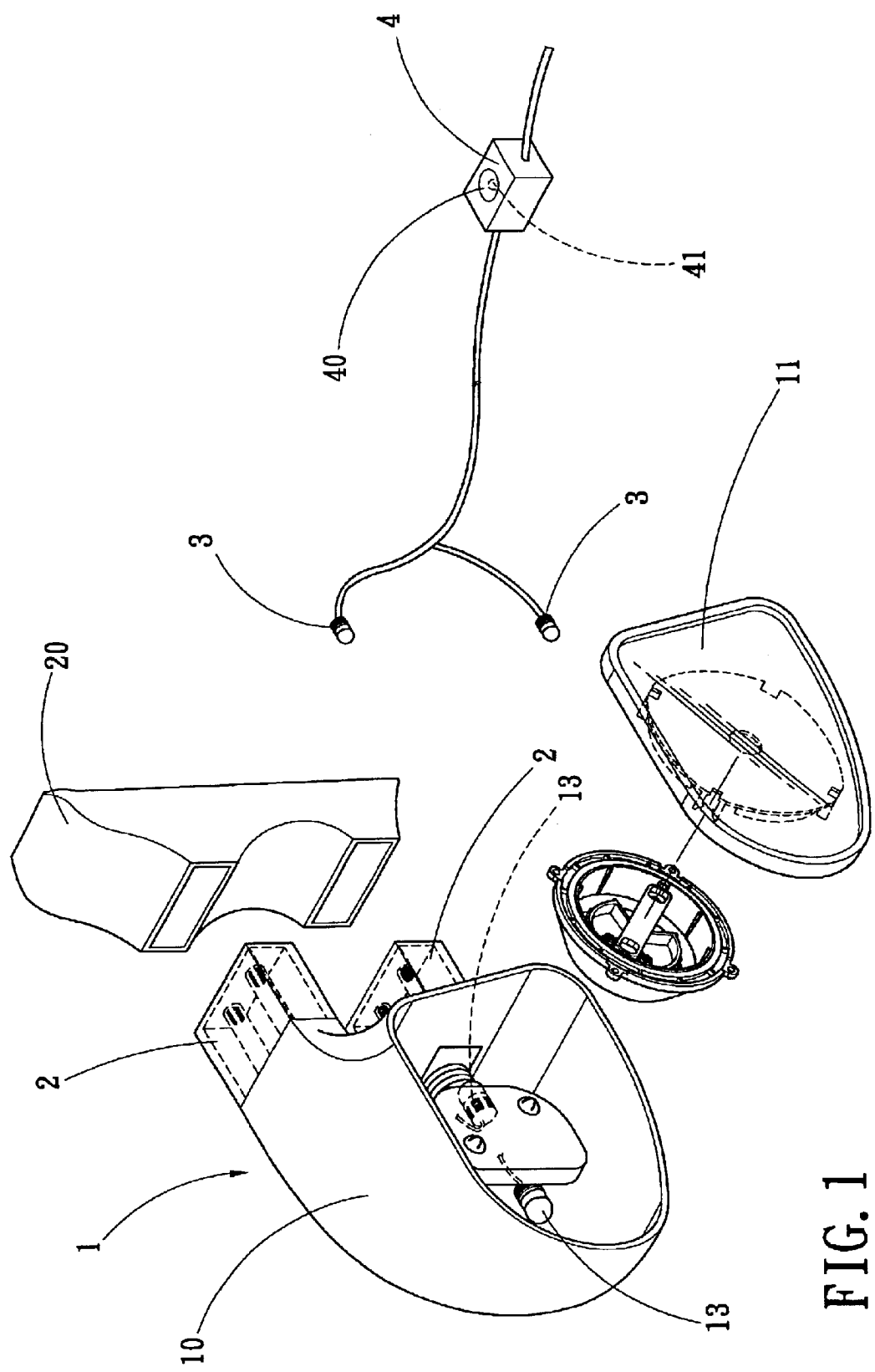
FIG. 1 is an exploded view of a rearview mirror assembly with color-changing arms according to one embodiment of the invention.

Wherever possible in the following description, like reference numerals will refer to like elements and parts unless otherwise illustrated.

Figure 2:
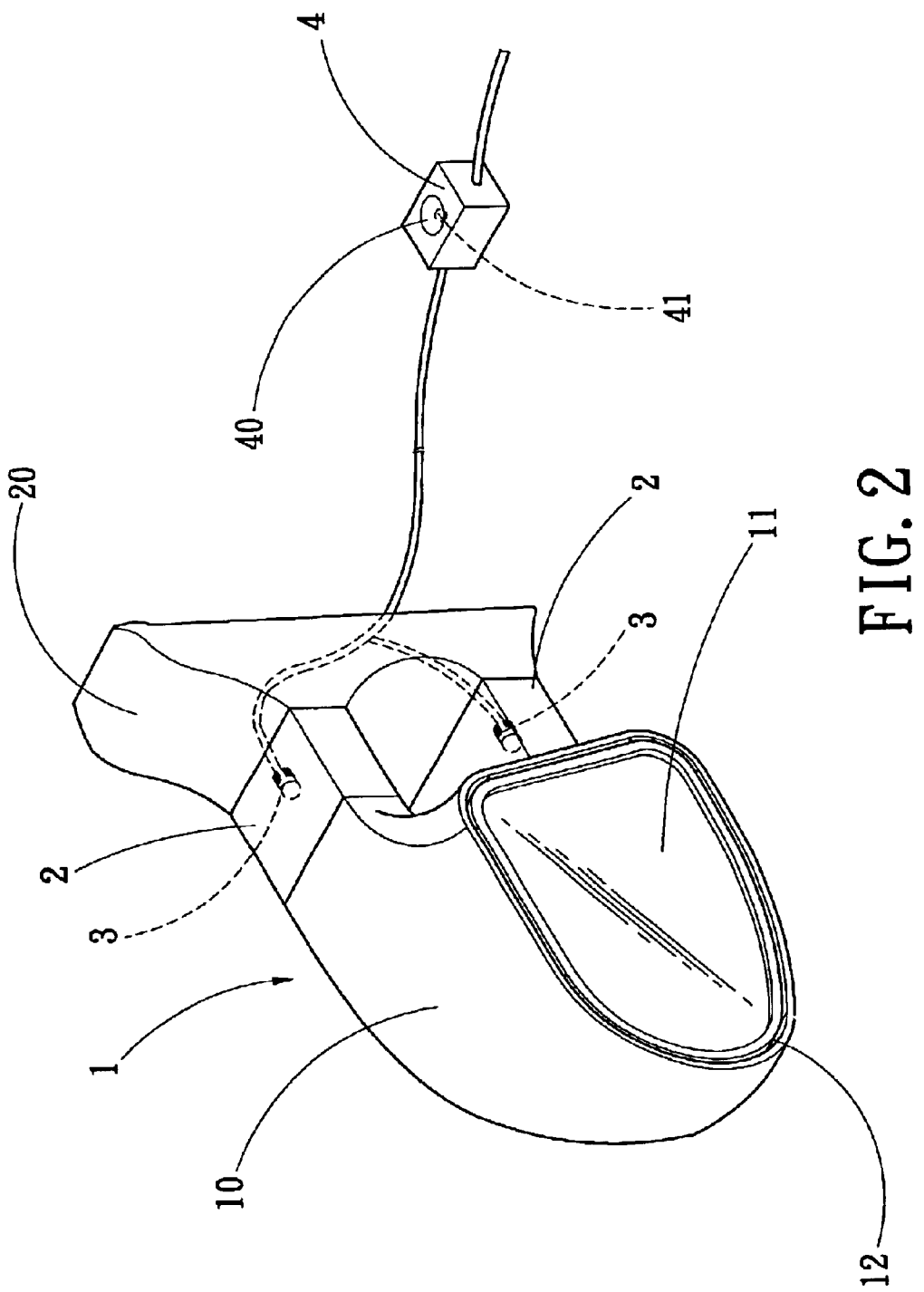
FIG. 2 is a schematic view of a rearview mirror assembly with color-changing arms according to one embodiment of the invention.
Figure 3:
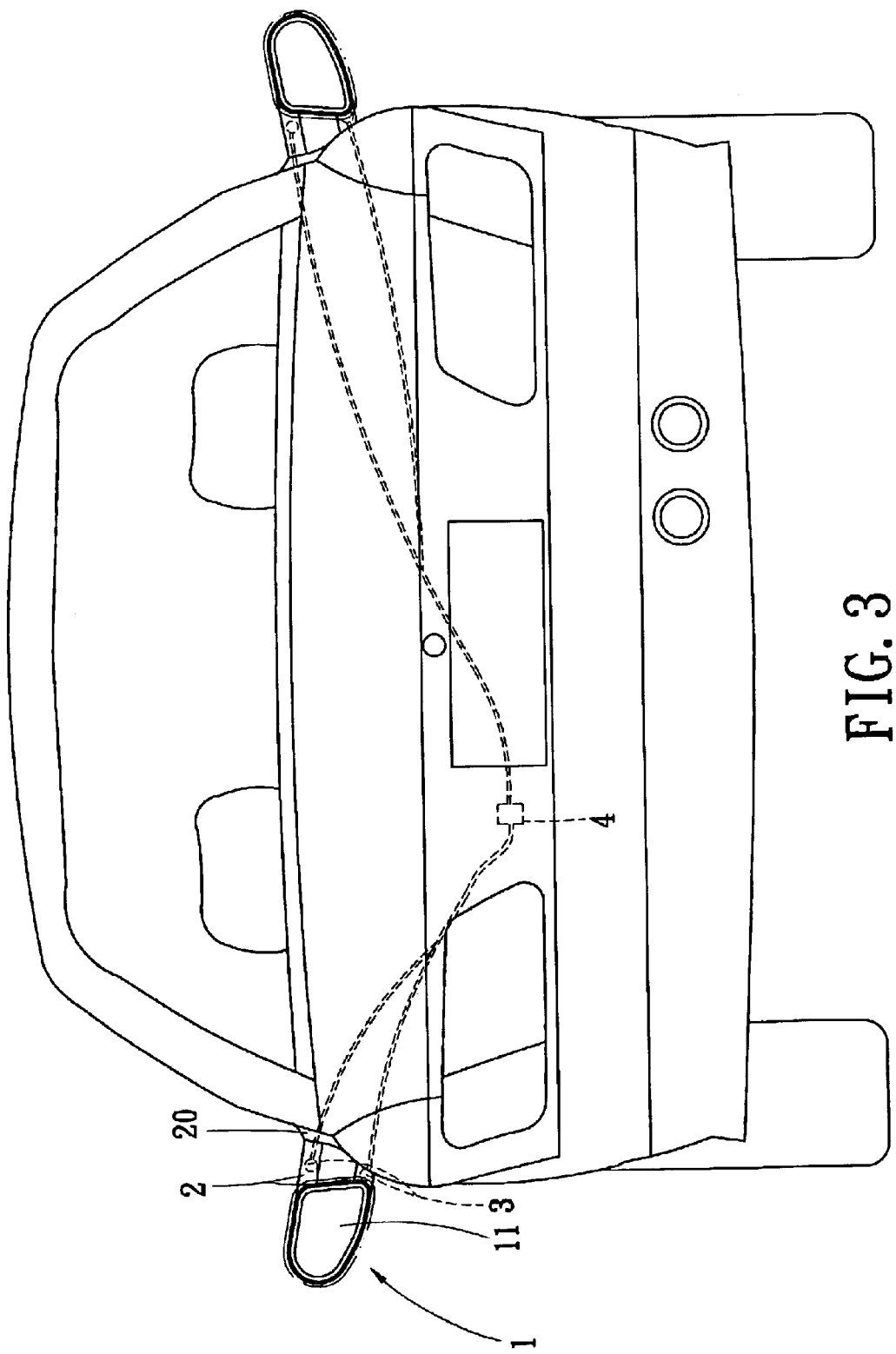
FIG. 3 is a schematic view illustrating a rearview mirror assembly with color-changing arms mounted on a car according to one embodiment of the invention.

Referring to FIG. 1 through FIG. 3, the invention provides a vehicle rearview mirror assembly with color-changing connector arms that includes a rearview mirror 1, a plurality of arms 2 and a plurality of arm light sources 3.

The rearview mirror 1 includes a casing 10 and a reflective mirror 11. The reflective mirror 11 is pivotally connected to the casing 10 in a manner that an edge of the reflective mirror 11 is spaced away from the casing 10 by a gap 12. A plurality of mirror light sources 13 are mounted inside the casing 10.

The arms 2 are made of, for example, a transparent material. A first end of each arm 2 is mounted on the casing 10 of the rearview mirror 1, and a second other end is assembled with a body of the vehicle. As illustrated in FIG. 2, the second end of each arm 2 is assembled on the body of the car by inserting into a base 20 that is then firmly mounted on the body of the car. In an embodiment of the invention, the arms 2 and the casing 10 of the rearview mirror 1 are, for example, integrally formed in a single body.

The arm light sources 3 include a plurality of light-emitting diodes (LED) mounted inside each arm 12. The arm light sources 3 are electrically connected to a switch 40.

The switch 40 is connected to a control circuit (not shown) to control the illumination and color change of all the arm light sources 3. The switch 40 and the control circuit are mounted in a control box 4. The switch 40 is further provided with an ON/OFF light source 41 that can be, for example, a LED. The colors of the ON/OFF light source 41 and arm light sources 3 can simultaneously change.

When the vehicle moves, the arm light sources 3 are controlled via the switch to switch between nine light configurations. The arm light sources 3 sequentially turn the light color to red, blue, purple, green, yellow, sky blue and white when the switch is successively pressed seven times. At the eighth pressing time of the switch 40, the light is turned off. At the ninth pressing time of the switch 40, the color automatically changes in the sequence of red, blue, purple, green, yellow, sky blue and white. The change of the light color is indicated by the indicator light source 41 of the control box 4. Different from the conventional monochromic small lighting, the rearview mirror assembly of the invention therefore emits bright and notable warning signs by changing the color of the arm light sources. Furthermore, the light from the arm light sources 3 radiates outwardly through the transparent arms 12. It therefore can significantly alert drivers to keep a sufficient safety distance to avoid car accidents. Furthermore, the mirror light sources 13 emit the light through the gap 12 between the reflective mirror 11 and the casing 10 to outline the rearview mirror 1 and increase the warning performance.

The color change of the light emitted from the arm light sources 3 not only effectively alerts other drivers to keep a proper safety distance, but also increases the aesthetic aspect of the car.

As described above, the rearview mirror assembly with color-changing arms according to the invention therefore has at least the following advantages:

1. The color change of the light emitted from the arm light sources 3 via the transparent arms can notably outline the width of the car body, especially in dark conditions, to help keep a proper safety distance between running cars and avoid traffic accident.
2. The mirror light sources emit the light through the gap between the reflective mirror and the casing to outline the rearview mirror, and therefore increase the warning performance.
3. The color change of the light emitted from the arm light sources further increases the aesthetic aspect of the car.

It should be apparent to those skilled in the art that the above description is only illustrative of specific embodiments and examples of the invention. The invention should therefore cover various modifications and variations made to the herein-described structure and operations of the invention; provided they fall within the scope of the invention as defined in the following appended claims.

What is claimed is:

1. A vehicle rearview mirror assembly with color-changing arms, comprising:

a rearview mirror, having a casing;

at least one transparent arm, wherein a first end thereof is mounted on the casing of the rearview mirror, and a second and thereof is mounted on a body of the vehicle; and an arm light source respectively mounted inside the transparent arm and electrically connected to a switch, wherein the switch is connected to e control circuit to control the illumination and color change of the arm light source.

2. The vehicle rearview mirror assembly of claim 1, wherein the rearview mirror includes a reflective mirror pivotally connected to the casing in a manner that an edge of the reflective mirror is spaced away from the casing gap, the arm light source being mounted inside the casing.

3. The vehicle rearview mirror assembly of claim 1, wherein the rearview mirror is connected to the transparent arm.

4. The vehicle rearview mirror assembly of claim 1, wherein the transparent arm is firmly mounted on the body of the car via a base.

5. The vehicle rearview mirror assembly of claim 1, wherein the color of the light emitted from the arm light source changes in a sequence of different colors.

6. The vehicle rearview mirror assembly of claim 1, wherein the switch is further provided with an indicator light source that has colors simultaneously changing along with the changes of the arm light source.

7. The vehicle rearview mirror assembly of claim 1, wherein the arm light source is a light-emitting diode (LED).

8. The vehicle rearview mirror assembly of claim 6, wherein the indicator light source is a light-emitting diode (LED).

9. The vehicle rearview mirror assembly of claim 2, wherein the arm and the casing of the rearview mirror are integrally formed in a single body.

* * * * *